United States Patent
Johnson et al.

(10) Patent No.: US 6,508,031 B1
(45) Date of Patent: Jan. 21, 2003

(54) RODENT TRAP WITH REMOVABLE BAIT CONTAINER

(75) Inventors: Daniel C. Johnson, Madison, WI (US); James R. Walsh, Wauwatosa, WI (US); Scott J. Collins, Brown Deer, WI (US)

(73) Assignee: Bell Laboratories, Inc., Madison, WI (US)

( * ) Notice: Subject to any disclaimer, the term of this patent is extended or adjusted under 35 U.S.C. 154(b) by 0 days.

(21) Appl. No.: 10/002,401

(22) Filed: Oct. 26, 2001

(51) Int. Cl.$^7$ .............................................. A01M 23/26
(52) U.S. Cl. ............................................ 43/88; 43/83.5
(58) Field of Search .............................. 43/82, 88, 83.5, 43/81

(56) References Cited

U.S. PATENT DOCUMENTS

| | | | | |
|---|---|---|---|---|
| 1,080,623 A | * | 12/1913 | Brorby ........................... | 43/88 |
| 2,000,752 A | * | 5/1935 | Graybill ...................... | 43/83.5 |
| 2,031,520 A | * | 2/1936 | Zahm et al. ................. | 43/83.5 |
| 2,068,508 A | * | 1/1937 | Orr ............................ | 43/83.5 |
| 2,161,874 A | * | 6/1939 | Lehn et al. .................. | 43/83.5 |
| 2,216,529 A | | 10/1940 | Brzykcy | |
| 2,321,617 A | * | 6/1943 | Peterson ..................... | 43/83.5 |
| 2,428,721 A | * | 10/1947 | Peterson ..................... | 43/83.5 |
| 2,525,533 A | * | 10/1950 | Dunkelberger .............. | 43/83.5 |
| 2,611,991 A | * | 9/1952 | Lehn ........................... | 43/83.5 |
| 2,637,931 A | * | 5/1953 | Sklar ........................... | 43/83.5 |
| 2,702,443 A | * | 2/1955 | Bruske ......................... | 43/81 |
| 2,724,209 A | * | 11/1955 | Cain ............................ | 43/83.5 |
| 2,778,149 A | * | 1/1957 | Edwards ...................... | 43/83.5 |
| 4,369,595 A | | 1/1983 | Kness et al. | |
| 4,711,049 A | | 12/1987 | Kness | |

FOREIGN PATENT DOCUMENTS

CA        0 280 504 A2 *   8/1988   .................. 43/83.5

* cited by examiner

Primary Examiner—Peter M. Poon
Assistant Examiner—Joan M. Olszewski
(74) Attorney, Agent, or Firm—Lathrop & Clark LLP

(57) ABSTRACT

A rodent trap particularly adapted for rats has a plastic base to which a plastic upper jaw is pivotably mounted by a steel pin. A spring is engaged between the base and the upper jaw and urges the jaw to close upon the base. A trigger is pivotably mounted by the pin to ears which project upwardly from the base. A catch mechanism operates to restrain the upper jaw in a set position until the trigger is actuated. A plastic bait container has radially protruding flanges which permit it to be extended through a hole in the base beneath the trigger and secured to the base such that the bait within the container is accessible through another hole in the trigger. In one embodiment, the bait container is generally cylindrical and is twisted into place. The bait container is readily removed for replenishment.

22 Claims, 2 Drawing Sheets

RODENT TRAP WITH REMOVABLE BAIT CONTAINER

CROSS REFERENCES TO RELATED APPLICATIONS

Not applicable

STATEMENTS AS TO RIGHTS TO INVENTIONS MADE UNDER FEDERALLY SPONSORED RESEARCH AND DEVELOPMENT

Not applicable

BACKGROUND OF THE INVENTION

The present invention relates to rodent traps in general, and to baited rodent traps in particular.

Rodents such as mice and rats are perennial pests, devouring food stores, spreading disease, soiling dwellings and storage and production facilities, and degrading fixtures and structures by gnawing, scratching, and nesting. Some rodent infestations may be dealt with by the distribution of poisoned bait. In other situations, where it is desirable to avoid the use of rodenticide, or where the retention of the targeted rodent is necessary, mechanical rodent traps may be employed.

Although a wide variety of mechanical rodent traps are effective for capture of mice, successful trapping of rats presents greater challenges. Not only are rats larger than mice, they are generally more cautious and more difficult to trap.

Because of the high level of striking force required to effectively dispatch a rat, traps will typically employ one or more substantial coil springs which act upon a sturdy bail. Conventional wooden-base traps use a heavy gauge steel wire bail retained in the set position by some type of clasp which is released when the trap trigger is depressed. Although providing effective striking forces, the open metal bails are subject to corrosion, provide minimal isolation between the operator arid the soiled portions of the activated trap, and are limited in their possible ergonomic configurations. Moreover, these wire bails are usually smooth and rounded, and thus a rodent may be able to extract a limb engaged beneath such a bail.

Rat traps with closed plastic bails are known. These traps advantageously place a barrier between the operator and the trapped rodent. In addition, when fabricated of plastic, a wide variety of shapes are possible, including those which facilitate convenient and low stress setting of the trap, and subsequent discharge of rodents caught in the trap. However, because the closed plastic bail covers the trigger when the trap is sprung, any bait to be placed in the trap must be positioned with the bail in a set or partially set condition—thereby presenting the potential of activating the spring-loaded bail during the process of loading the trap with bait.

What is needed is a rodent trap which can be conveniently loaded with bait without imperiling the operator.

SUMMARY OF THE INVENTION

The rodent trap of this invention has a plastic base to which a plastic upper jaw is pivotably mounted by a steel pin. A spring is engaged between the base and the upper jaw and urges the jaw to close upon the base. A trigger is pivotably mounted by the pin to ears which project upwardly from the base. A catch mechanism operates to restrain the upper jaw in a set position until the trigger is actuated. A plastic bait container has radially protruding flanges which permit it to be extended through a hole in the base beneath the trigger and secured to the base such that the bait within the container is accessible through another hole in the trigger. In one embodiment, the bait container is generally cylindrical and is twisted into place. The bait container is readily removed for replenishment. The base and the upper jaw are provided with sinusoidal interdigitating teeth which contribute to retaining the rodent in connection with the trap even if only a small portion of the rodent, such as a limb, is caught within the teeth. Moreover, the trap can be readily set by foot.

It is an object of the present invention to provide a mechanical rodent trap which can be safely baited while in the set position or in the sprung position.

It is another object of the present invention to provide a rodent trap which may be conveniently set by foot.

It is also an object of the present invention to provide a plastic rodent trap with adequate striking force to incapacitate a rat.

Further objects, features and advantages of the invention will be apparent from the following detailed description when taken in conjunction with the accompanying drawings.

DESCRIPTION OF THE PREFERRED EMBODIMENTS

Figure 1:
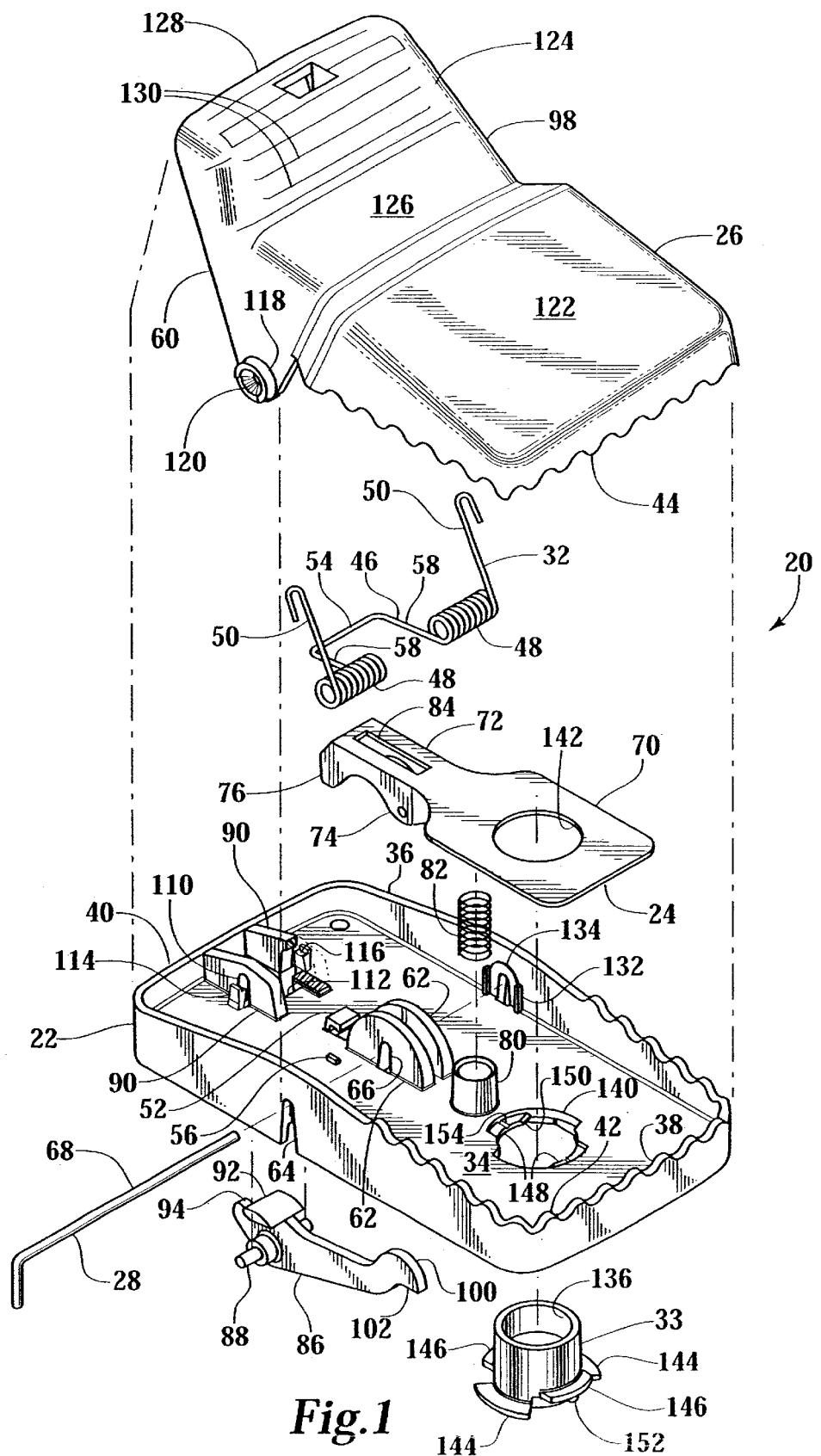
FIG. 1 is an exploded isometric view of the rodent trap of this invention.
Figure 2:
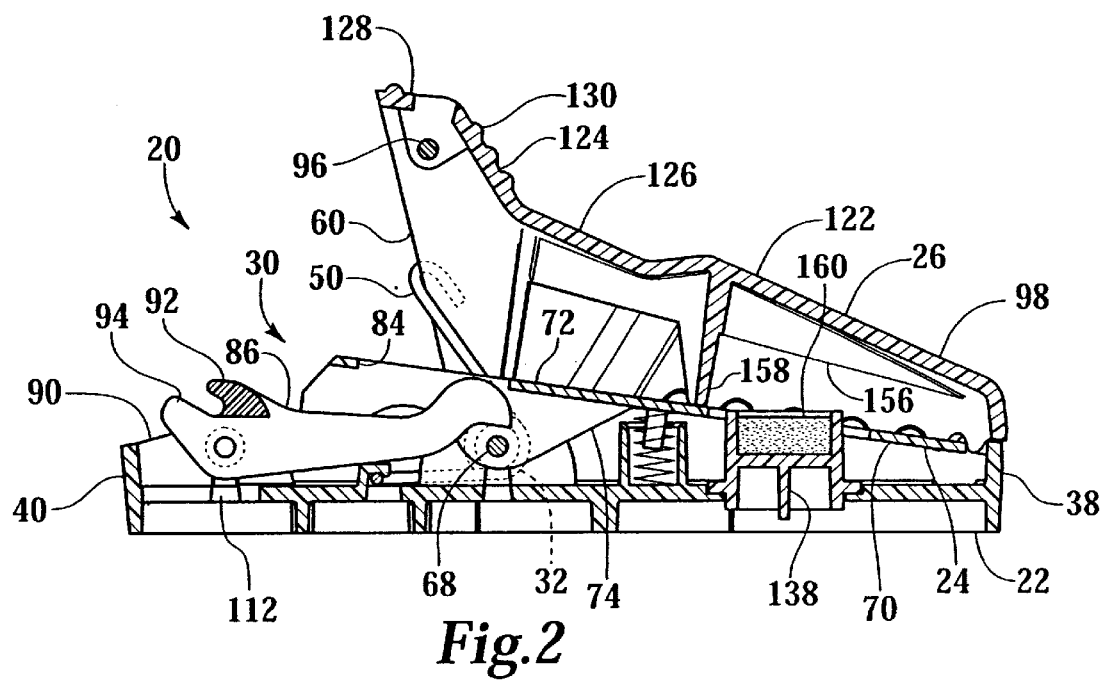
FIG. 2 is a cross-sectional view of the trap of FIG. 1 shown in a sprung position.
Figure 3:
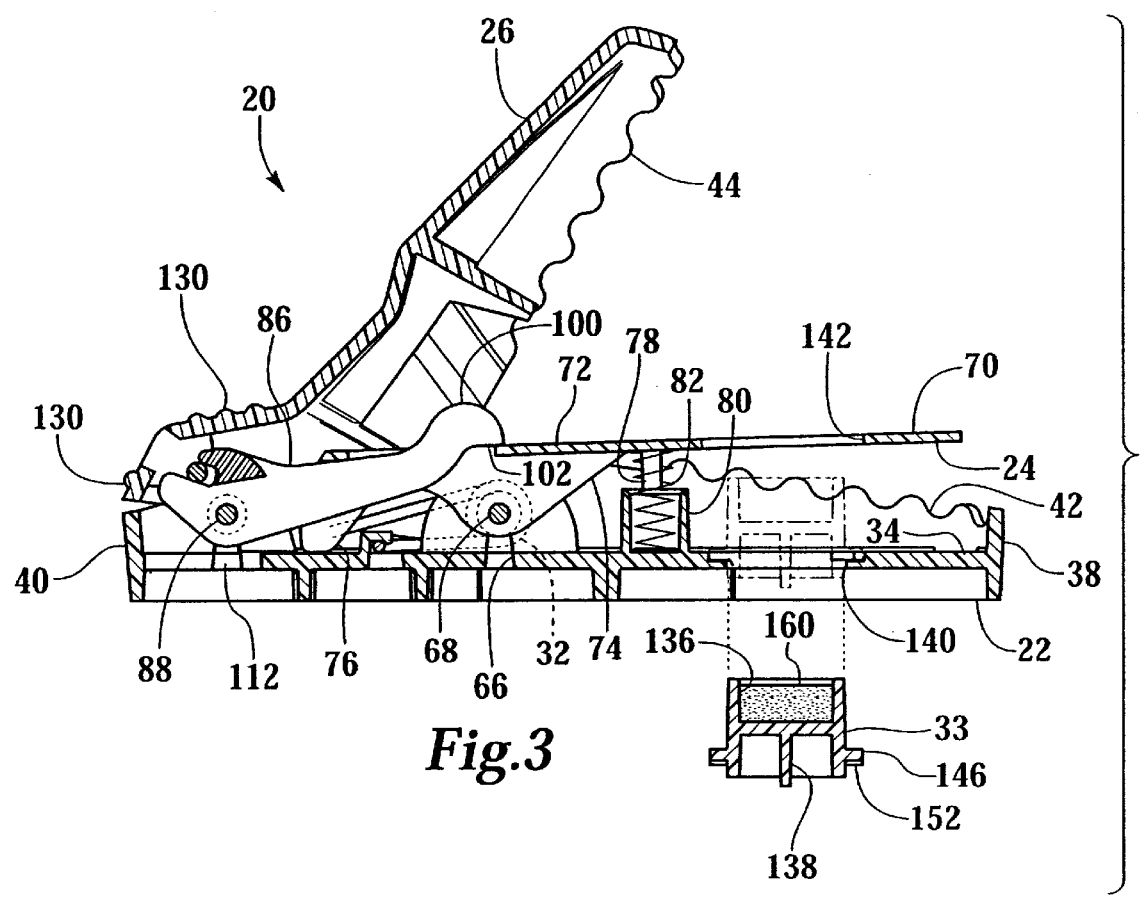
FIG. 3 is an exploded cross-sectional view of the trap of FIG. 2 shown in a set position.

Referring more particularly to FIGS. 1–3, wherein like numbers refer to similar parts, a rodent trap 20 of this invention is shown in FIG. 1. The trap has a plastic base 22 to which a plastic trigger 24 and upper jaw 26 are pivotably connected by a metal pin 28. A catch mechanism 30 extends from the base 22 and engages with the trigger and the upper jaw 26 to retain the upper jaw 26 in a set position against the force of a spring 32 which tends to urge the upper jaw 26 into a sprung or trapping position. A bait container 33 is removably connected to the base 22. The plastic parts may be injection molded of for example, ABS plastic or polystyrene.

The trap 20 is preferably large enough to accommodate rats. The base 22 may be about 5.6 inches long and three inches wide. The base 22 has a horizontal platform wall 34 with vertically extending side walls 36 and a front wall 38 and a rear wall 40. The platform wall 34 is supported about 0.20 inches above the support surface on which the trap rests, and preferably has a pattern of reinforcing ribs on its underside, not shown. The front wall 38 has a series of undulating teeth 42 which continue along portions of the side walls 36. The teeth 42 preferably interdigitate with downwardly facing teeth 44 which project from the upper jaw 26 in a manner similar to the teeth disclosed in U.S. Application Ser. No. 09/560,362, filed Apr. 28, 2000, entitled Rodent Trap with Entrapping Teeth, the disclosure of which is incorporated by reference herein. The interdigitating teeth act advantageously to grip a portion of a rodent, such as a limb, and prevent the rodent from escaping from the trap even if the descent of the upper jaw does not kill the rodent.

The spring 32 is a torsion wire spring formed of black oxide plated music wire, having a central U-shaped segment 46 which connects two coiled segments 48 of about nine coils each, and which each terminate in a J-shaped hook 50. To assist in the assembly and positioning of the spring 32, the base is provided with a central flange 52 which projects upwardly and frontwardly over the center arm 54 of the U-shaped segment 46, and two shallow rectangular nubbins 56 which project on either side of the legs 58 of the U-shaped segment. The spring hooks 50 extend upwardly and engage with the side walls 60 of the upper jaw 26. The point at which the spring hooks 50 engage the upper jaw side walls 60 will be selected in conjunction with the spring force of the spring 32 to obtain the desired kinetic energy on impact to strike the captured rodent, and the desired holding force once the trap is sprung.

Positioned between the legs 58 of the U-shaped segment 46 of the spring 32 and frontwardly of the center arm 54 are two upwardly projecting semicircular ears 62. The trigger 24 is pivotably mounted to the base 22 between the ears 62 by the L-shaped steel pin 28 which extends through aligned vertical slots 64 in the base side walls 36 and slots 66 in the ears. The horizontal segment 68 of the pin 28 also pivotably connects the upper jaw 26 to the base 22. The horizontal segment 68 of the pin 28 extends through the coiled segments 48 of the spring 32 and thereby fastens the spring to the base 22.

The trigger 24 has a forward trigger plate 70 which is positioned above the base platform wall 34 and spaced inwardly about one-half inch from each toothed side wall 36. The trigger 24 has an arm 72 which extends rearwardly from the trigger plate 70. Two flanges 74 extend downwardly from the arm 72, on either side of the ears 62. The pin 28 extends through holes in the trigger arm flanges 74 thereby pivotably mounting the trigger to the base. A pair of stops 76 extends downwardly from the arm 72 rearward of the flanges 74. The stops 76 restrict the rearward pivoting of the trigger 24 when they engage the platform wall 34 of the base 22.

As shown in FIG. 3, a narrow cylindrical stud 78 extends downwardly from the underside of the trigger plate 70 frontwardly of the arm 72. The stud 78 is received within an upwardly extending cup 80 which protrudes from the base 22. A small coil spring 82 is positioned within the cup 80 to encircle the stud 78 and provide an upwardly acting force on the trigger plate which causes it to return to a nearly horizontal orientation when the upper jaw 26 is opened.

A slot 84 extends in the front-to-back direction along the trigger arm 72, allowing portions of a plastic pawl 86 to extend therethrough. As shown in FIG. 3, the pawl 86 has a metal axle 88 which pivotably mounts the pawl between two rear ears 90 which adjoin the base rear wall 40. The pawl 86 has an upper block 92 above a rearwardly opening groove 94. When the upper jaw 26 is pressed back into the set position, as shown in FIG. 3, a molded horizontal rod 96 suspended from the top wall 98 of the upper jaw is engaged within the groove 94 beneath the block 92. The action of the pressing the rod 96 into the groove 94 presents the pawl 86 such that the curved upper surface of the forward segment 100 of the pawl passes upwardly through the trigger arm slot 84. The underside 102 of the pawl forward segment 100 is approximately parallel to the top surface of the carrier arm forward of the slot 84. This arrangement holds the trigger plate 70 upward until it is depressed to actuate the trap, as shown in FIG. 2.

The spring 82, by holding the trigger plate in a near horizontal position, presents the trigger plate to be engaged by the pawl, whereas if the trigger plate were pivoted forwardly, the pawl would not engage the trigger plate at all.

As shown in FIG. 1, for convenience of manufacture and assembly, the rear ears 90 may be formed to permit the pawl 86 with sidewardly projecting rod 88 to be inserted from beneath the base 22. Each of the rear ears 90 has a downwardly opening groove 110 which connects with a sidewardly extending cutaway 112 in the base platform 34. A wedge shaped rod support 114 extends upwardly from the base platform 34 at the end of each cutaway 112 directly outside each rear ear groove 110. The top of each rod support 114 has a semicircular depression 116 which opens towards the groove 110, but which is closed on the opposite side. The pawl 86 with inserted rod 88 is installed by passing the forward segment 100 through an opening between the two rear ears 90 which joins the grooves 110. The pawl forward segment 100 extends between the stops 76 of the trigger arm 72. The rod 88 is urged upwardly within the grooves 110 such that the ends of the rod bear against the wedge shaped portions of the rod support 114 causing the plastic to resiliently deform outwardly until the rod 88 passes onto the semicircular depressions 116, at which point the rod is retained for pivotal motion of the pawl 86.

As shown in FIG. 1, the upper jaw side walls 60 are terminated by protruding cylindrical rings 118 through which the pin 28 extends. A conical surface 120 is preferably provided on the interior of one of the rings 118 on the side of the upper jaw 26 where the pin 28 enters. The conical surface 120 assists in centering the pin in the pin holes centered within each ring 118, thereby facilitating rapid assembly of the trap 20. This assembly is further aided by pairs of vertically extending parallel ribs 132 which project inwardly from each base side wall 36 on either side of the side wall slots 64. The rings 118 are positioned by the ribs 132 to properly align the upper jaw 26 with respect to the base 22. To provide for mold release, the interior surfaces of the side walls 36 are inclined outwardly with respect to the base platform wall 34. However, for a better bearing between the upper jaw and the base, zero-draft sections 134 may be provided between the ribs 132 where the side walls engage the upper jaw rings 118.

The top wall 60 of the upper jaw 26 has a forward section 122 which extends generally over the portions of the upper jaw having teeth 44, an intermediate section 126 which is approximately parallel to the forward section and spaced below it, a foot section 124 which extends from the intermediate section at an angle of about 135 degrees, and a rear section 128 which projects from the foot section and terminates the upper jaw 26. The foot section is preferably provided with a plurality of protruding ridges 130 to help with frictional engagement of the upper jaw 26 by an operator's foot. The rear section 128 may also have one or more ridges 130. The foot section 124 and the rear section 128 are positioned rearwardly of the axis defined by the pin 28, such that when the operator steps on the rear section and the foot section, the upper jaw pivots rearwardly until the trap is in a set position as shown in FIG. 2.

The trap 20 may be set by clasping the rear of the trap in one hand and applying force to bring the upper jaw rod 96 into engagement with the pawl groove 94. The configuration of the trap 20 is also, however, well-suited to hands-free setting of the trap. With the trap resting on a support surface, an operator may approach the trap and place a foot on the rear section 128 of the upper jaw top wall 98. As foot pressure is applied, the upper jaw 26 pivots rearwardly bringing the foot section 128 into contact with the operator's foot, allowing broader contact between the foot and the upper jaw to apply force to overcome the spring 32 and set the trap. Foot operation has the advantage of allowing a trap to be set by an operator without the need to bend down, or allow the hands to come in contact with a possibly soiled trap. Moreover, persons suffering from reduced hand strength can still effectively set the trap 20.

When the trap is sprung, as shown in FIG. 2, the trigger plate 70 is covered by the upper jaw. Thus, if it is desired to place bait downwardly on the trigger, it must be done when the upper jaw is pivoted rearwardly, such as shown in FIG. 3. However, in order to pivot the upper jaw rearwardly it is necessary to impart energy to the spring 32 and thereby present the possibility that the upper jaw may return and strike the fingers of the operator attempting to place bait on the trigger. The trap 20 provides for baiting of the trap while it is in either a set or a sprung configuration by supplying the readily removable bait container 33, as shown in FIG. 3.

The bait container 33 is a generally cylindrical plastic element which has an upwardly opening bait cavity 136 into which an operator may place substances which are alluring to the targeted rodents, for example peanut butter. This bait 160 may attract rodents to depress the trigger. The cavity 136 extends to about ½ the depth of the container 33. A grasping tab 138 extends downwardly beneath the cavity 136. The grasping tab 138 is a vertical segment of plastic which can be engaged by an operator's fingers for rotating the bait container 33. As best shown in FIG. 1, the bait container extends through a bait container opening 140 formed in the platform wall 34 of the base 22, and through a circular trigger opening 142 formed in the trigger plate 70 above the bait container opening 140. The bait within the bait container is thus presented to the targeted rodent in the central region of the trigger plate 70 to encourage the rodent to approach the trigger and depress it. The bait container 33 is removably secured to the base 22. Many engagement mechanisms may be employed, including snap connections, bayonet connections, sliding connections, separable adhesive connections, etc., such engagement mechanisms providing a means for removably securing the bait container to the base. The mechanism illustrated employs a twisting motion to engage the bait container 33 to the base 22.

The bait container has two horizontal lower flanges 144, shown in FIG. 1, and two parallel upper flanges 146 which are spaced above the lower flanges 144 about the thickness of the base flanges 148 which project into the bait container opening 140. The bait container upper flanges 146, although they are positioned above the bait container lower flanges 144, are not directly above the lower flanges. Thus the bait container 33 may be inserted into the bait container opening 140 so that the upper flanges 146 pass between the two base flanges 148. By rotating the bait container 33, the upper flanges 146 pass up narrow ramps 150 formed on each base flange 148 and then pass over the base flanges, until a thin protruding ridge 152 formed on the underside of each upper flange engages within a narrow groove 154 formed on the upper surface of each base flange. In this final position, the lower flanges 144 will be positioned beneath portions of the base flanges 148.

The bait container 33 allows an operator to conveniently and rapidly load the trap 20 with bait without the need to first set the traps. Hence the bait container is movable with respect to the trigger between a first position wherein the bait container is secured to the base and is positioned adjacent the trigger, and a second position in which the bait cavity is spaced from the trigger at distance greater than the first distance and is accessible for loading with bait In addition, because of the modular self-contained nature of the bait containers, an operator may choose to preload a number of bait containers for replacing baits in the field in previously distributed traps, or the manufacturer may prepare sealed preloaded bait containers, with the seal being removable in the field to expose the contained bait prior to installation in a trap 20.

The upper jaw 26 top wall 98 is preferably reinforced with downwardly extending ribs 156 in an "X" pattern. A strut 158, shown in FIG. 2, extends downwardly from the ribs 156 where they intersect. The strut 158 is positioned to engage the trigger 24 rearwardly of the bait container opening 140 to depress the trigger when the trap is sprung. The strut depresses the trigger sufficiently to avoid the possibility of the pawl remaining engaged above the trigger arm when the trap is attempted to be reset. By so depressing the trigger when the trap is sprung, the strut 158 insures that the trap may be reset repeatedly.

It should be noted that the pawl, trigger slot, and related structure comprise a catch mechanism which allows the trap to be set and activated with the desired level of sensitivity. However, other rodent trap catch mechanisms may be employed with the removable bait container of this invention. Moreover, the removable bait container may be used in connection with traps employing over center hinge mechanisms, such as the one disclosed in U.S. patent application Ser. No. 09/560,362, filed Apr. 28, 2000. In addition, a number of structures have been disclosed which facilitate the manufacture and assembly of the trap parts, including structure adapted for injection molding, however, the parts may be made otherwise, or using processes other than injection molding.

It is understood that the invention is not limited to the particular construction and arrangement of parts herein illustrated and described, but embraces all such modified forms thereof as come within the scope of the following claims.

We claim:

1. A rodent trap comprising:
   a base having portions defining a bait container opening;
   an upper jaw pivotably mounted to the base;
   a spring engaged between the base and the upper jaw and urging the jaw to close upon the base;
   a trigger mounted to the base, the trigger having portions defining a first opening therein;
   a catch mechanism which restrains the upper jaw in a set position until the trigger is actuated; and
   a bait container which is connected to the base and which protrudes through the bait container opening in the base, and which is accessible through the trigger first opening, the bait container having portions which project from the bait container to engage with portions of the base to selectably secure the bait container to the base, such that in a first position the bait container is fixed to the base and in a second position the bait container is not retained to the base.

2. The rodent trap of claim 1 further comprising a plurality of ridges protruding upwardly from the upper jaw, the ridges being positioned to retain an object being pressed downward on the trap to assist in the foot-operated setting of the trap.

3. The rodent trap of claim 1 wherein the upper jaw is pivotably mounted to the base about a pivot axis, and wherein the upper jaw has a top wall with a section which extends frontwardly of the pivot axis, and has a plurality of teeth formed thereon, and the top wall has a section which extends rearwardly of the pivot axis, such that the trap may be operated by foot by depressing the rearwardly extending section.

4. The rodent trap of claim 1 wherein the catch mechanism further comprises:
a pawl pivotably mounted to the base and having a rearwardly opening groove which engages portions of the upper jaw when the trap is in a set condition; and
portions of the trigger defining a rearwardly extending slot, wherein portions of the pawl extend into the slot, and the upper jaw is retained in the set position until the trigger is depressed to release the pawl from engagement therewith.

5. The rodent trap of claim 4 further comprising a strut extending downwardly from the upper jaw toward the trigger, such that when the upper jaw is closed on the base, the trigger is depressed sufficiently to fully disengage the pawl from the trigger.

6. The rodent trap of claim 1 wherein the base has at least one base flange projecting into the bait container opening, and the bait container is generally cylindrical, and the portions which project from the bait container comprise at least one flange which is rotatable to engage said at least one base flange in the first position.

7. The rodent trap of claim 1 wherein the portions which project from the bait container to engage portions of the base comprise a means for removably securing the bait container to the base.

8. A rodent trap comprising:
a base having portions defining a bait container opening;
a trigger mounted to the base, the trigger having portions defining a first opening therein;
an upper jaw pivotably mounted to the base, for movement between a set position in which portions of the trigger are revealed for access by a rodent, and a sprung position, in which the trigger is covered;
a spring engaged between the base and the upper jaw and urging the jaw to close upon the base;
a bait container having portions which project therefrom to engage with portions of the base to selectably secure the bait container to the base, such that in a first position the bait container is fixed to the base, and in a second position the bait container is not retained to the base, wherein the bait container in the first position is connected to the base and protrudes through the bait container opening in the base, and is accessible through the trigger first opening, the bait container being removable from the base.

9. The rodent trap of claim 8 further comprising a plurality of ridges protruding upwardly from the upper jaw, the ridges being positioned to retain an object being pressed downward on the trap to assist in the foot-operated setting of the trap.

10. The rodent trap of claim 8 wherein the upper jaw is pivotably mounted to the base about a pivot axis, and wherein the upper jaw has a top wall with a section which extends frontwardly of the pivot axis, and has a plurality of teeth formed thereon, and the top wall has a section which extends rearwardly of the pivot axis, such that the trap may be operated by foot by depressing the rearwardly extending section.

11. The rodent trap of claim 8 wherein the base has at least one base flange projecting into the bait container opening, and the bait container is generally cylindrical, and the portions which project from the bait container comprise at least one flange which is rotatable to engage said at least one base flange in the first position.

12. The rodent trap of claim 8 wherein the portions which project from the bait container to engage portions of the base comprise a means for removably securing the bait container to the base.

13. A rodent trap comprising:
a base having mounted thereon a bait container having an upwardly opening bait cavity;
an upper jaw pivotably mounted to the base;
a spring engaged between the base and the upper jaw and urging the jaw to close upon the base;
a trigger mounted to the base, the trigger having portions which are adjacent to but do not overlie the upwardly opening bait cavity;
a catch mechanism which restrains the upper jaw in a set position until the trigger is actuated; and
wherein the bait container has portions which project from the bait container to, in a first position, engage with portions of the base to secure the bait container to the base, and in a second position to no longer retain the bait container to the base, and the bait container is movable with respect to the trigger, between the first position wherein the bait container is secured to the base and the bait cavity protrudes through the trigger, and the second position in which the bait cavity is spaced from the trigger and is accessible for loading with bait.

14. The rodent trap of claim 13 further comprising a plurality of ridges protruding upwardly from the upper jaw, the ridges being positioned to retain an object being pressed downward on the trap to assist in the foot-operated setting of the trap.

15. The rodent trap of claim 13 wherein the upper jaw is pivotably mounted to the base about a pivot axis, and wherein the upper jaw has a top wall with a section which extends frontwardly of the pivot axis, and has a plurality of teeth formed thereon, and the top wall has a section which extends rearwardly of the pivot axis, such that the trap may be operated by foot by depressing the rearwardly extending section.

16. The rodent trap of claim 13 wherein the catch mechanism further comprises:
a pawl pivotably mounted to the base and having a rearwardly opening groove which engages portions of the upper jaw when the trap is in a set condition; and
portions of the trigger defining a rearwardly extending slot, wherein portions of the pawl extend into the slot, and the upper jaw is retained in the set position until the trigger is depressed to release the pawl from engagement therewith.

17. The rodent trap of claim 16 further comprising a strut extending downwardly from the upper jaw toward the trigger, such that when the upper jaw is closed on the base, the trigger is depressed sufficiently to fully disengage the pawl from the trigger.

18. The rodent trap of claim 13 wherein the base has at least one base flange projecting into the bait container opening, and the bait container is generally cylindrical, and the portions which project from the bait container comprise at least one flange which is rotatable to engage said at least one base flange in the first position.

19. The rodent trap of claim 13 wherein the portions which project from the bait container to engage portions of the base comprise a means for removably securing the bait container to the base.

20. A rodent trap comprising:
a base having mounted thereon a bait container having an upwardly opening bait cavity and portions which project therefrom to engage with portions of the base, said portions connecting the bait container to the base in a first position, and, when the bait container is moved to a second, different, position, releasing the bait container from the base;

an upper jaw pivotably mounted to the base;

a spring engaged between the base and the upper jaw and urging the jaw to close upon the base;

a trigger mounted to the base, the trigger having an uppermost position spaced above the base a first distance, and the trigger having portions which are adjacent to but do not overlie the upwardly opening bait cavity, the upper jaw being pivotable between a set position, in which the trigger is accessible by a rodent, and a sprung position, in which the upper jaw is closed over the trigger; and wherein the bait container is movable with respect to the trigger, between the first position wherein the bait container is secured to the base and is positioned adjacent the trigger, and the second position in which the bait cavity is spaced from the trigger at a distance greater than the first distance and is accessible for loading with bait.

21. The rodent trap of claim 20 wherein the base has at least one base flange projecting into the bait container opening, and the bait container is generally cylindrical, and the portions which project from the bait container comprise at least one flange which is rotatable to engage said at least one base flange in the first position.

22. The rodent trap of claim 20 wherein the portions which project from the bait container to engage portions of the base comprise a means for removably securing the bait container to the base.

* * * * *